Jan. 9, 1940.  A. C. CHRISTENSEN  2,186,575
AUTOMATIC BATCH WEIGHING MACHINE
Filed March 5, 1938  4 Sheets-Sheet 1
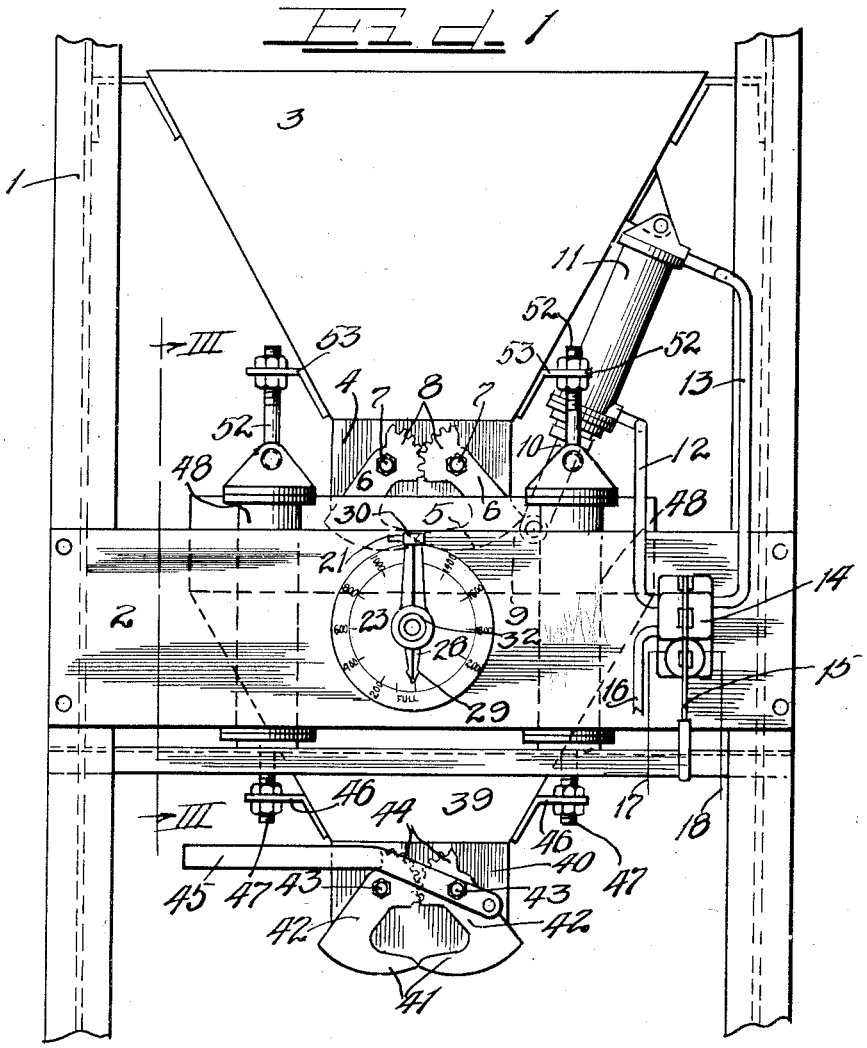
Inventor
Alfred C. Christensen.

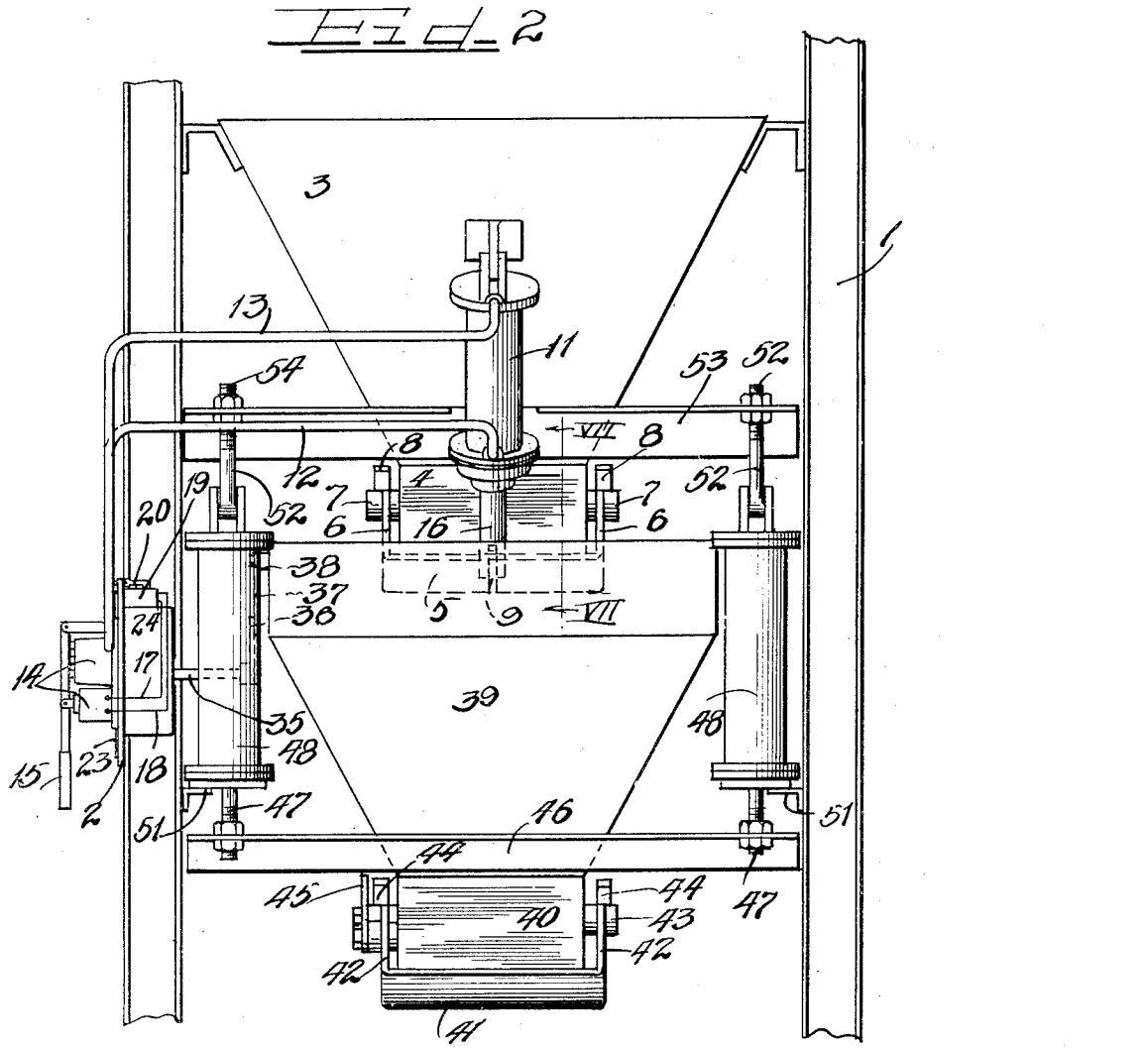

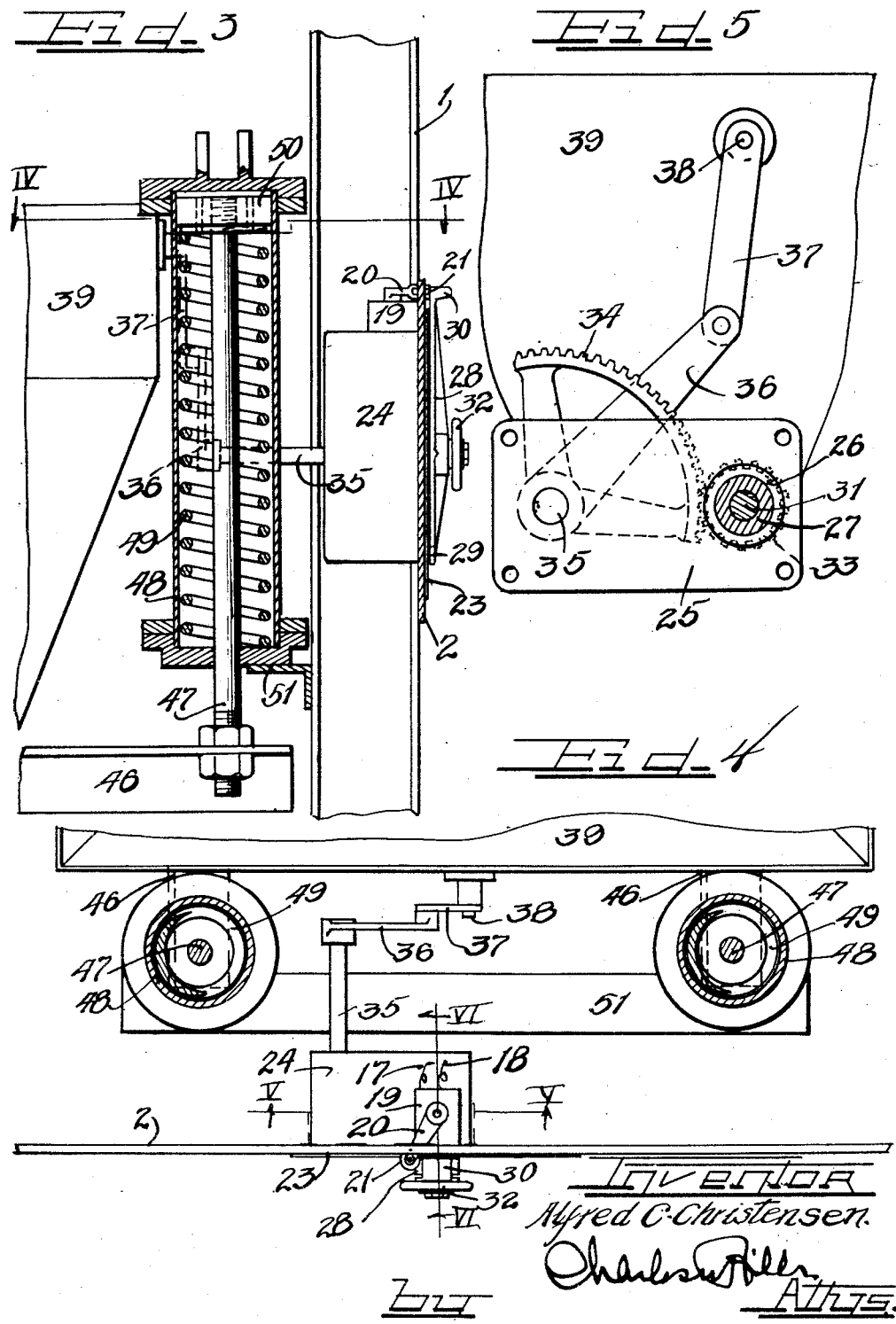

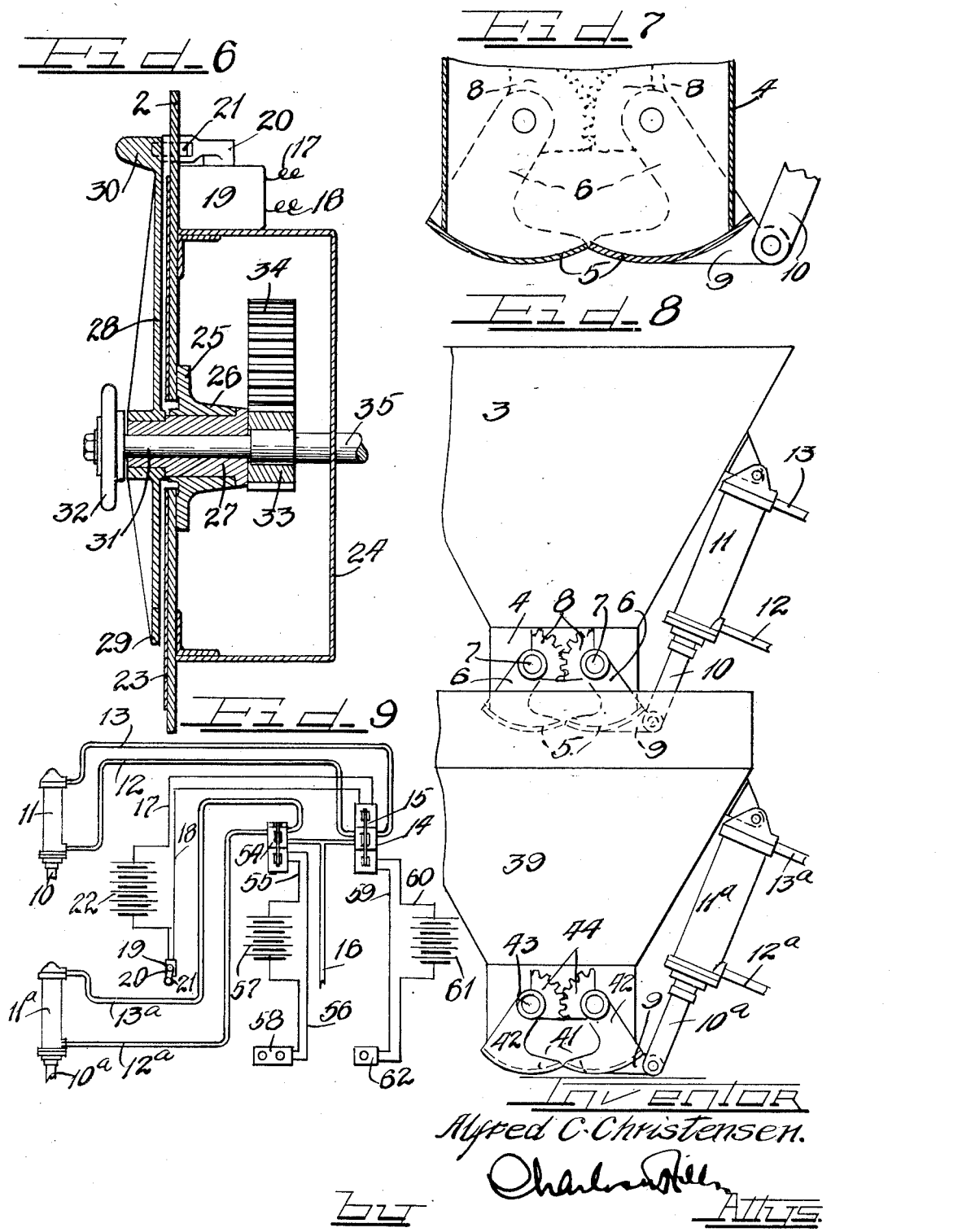

Patented Jan. 9, 1940

2,186,575

UNITED STATES PATENT OFFICE 2,186,575

AUTOMATIC BATCH WEIGHING MACHINE

Alfred C. Christensen, Chicago, Ill., assignor to Herbert S. Simpson, Chicago, Ill.

Application March 5, 1938, Serial No. 194,105

7 Claims. (Cl. 249—14)

The present invention relates to a material handling and measuring machine for measuring out predetermined quantities or batches of a selected material by means of a selectively set indicator which is associated with control means governed by means of the weight of the material deposited into a measuring hopper, the movement of which determines or times the opening and closing of a door provided in a supply or storage bin, said measuring hopper being provided with manually operable doors which are releasable for discharging the predetermined or measured batch of the material to permit automatic resetting of the indicator and the repeating of the cycle of operation for measuring out another predetermined batch of the material.

It is an object of this invention to provide an improved and simplified type of machine for measuring out predetermined batches of a material by means of automatic control mechanisms governed by the movement of a measuring hopper and by the operation of a manually controlled mechanism for opening and closing the discharge end of the measuring hopper.

It is also an object of this invention to provide a batch weighing machine including a supply bin having a spring supported movable measuring hopper positioned thereunder and governing the operation of control mechanisms for determining the opening and closing of the discharge doors of the bin and of the hopper depending upon the setting of an indicating mechanism which is adapted to be set to determine the quantity of the material to be weighed or delivered from the supply bin to the measuring hopper.

It is a further object of this invention to provide a machine for weighing out predetermined quantities of a material, the quantity of the material to be measured to form a batch depending upon the setting of an indicating mechanism which determines the time of operation of the discharge doors of the supply bin depending upon the movement of a measuring hopper.

It is furthermore an object of this invention to provide a machine for measuring predetermined batches of a material, including a supply bin having control doors associated therewith and governed by an air control mechanism, the operation of which is determined by a timing unit or limit switch device which is actuatable by means of an indicator adapted to be manually set and furthermore adapted to be moved depending upon the movement of a material receiving or weighing hopper movably mounted on the spring units of the machine beneath the supply bin.

It is an important object of this invention to provide a batch weighing machine of simplified and improved construction including a stationary bin and a movable spring supported hopper, said bin having discharge doors associated therewith and having the operation of said doors dependent upon the setting of an indicator and the operation of automatic controls operable by the movement of the indicator when material from the bin is discharged into the receiving hopper to weight the hopper and thereby cause movement of the indicator, said indicator being movable depending upon the movement of the weighing hopper caused by the depositing of material into the hopper and by the discharge of the batch of material from the hopper when the hopper doors are opened either manually or automatically.

Other and further important objects of this invention will be apparent from the disclosures in the specification and the accompanying drawings.

The invention, in a preferred form, is illustrated in the drawings and hereinafter more fully described.

On the drawings:

Figure 1 is a fragmentary front elevation of an improved automatic batch weighing machine embodying the principles of this invention.

Figure 2 is a fragmentary side elevation of the machine illustrated in Figure 1.

Figure 3 is an enlarged fragmentary sectional view taken along substantially line III—III of Figure 1 with parts shown in elevation and with parts shown in section.

Figure 4 is a fragmentary horizontal sectional view taken on line IV—IV of Figure 3.

Figure 5 is an enlarged fragmentary vertical sectional view taken on line V—V of Figure 4, with the switch mechanism and the gear housing omitted.

Figure 6 is an enlarged fragmentary vertical detail sectional view taken on line VI—VI of Figure 4 with parts shown in elevation.

Figure 7 is an enlarged fragmentary detailed vertical section taken on line VII—VII of Figure 2.

Figure 8 is a fragmentary front elevational view of a modified form of the batch weighing machine wherein the measuring hopper is provided with an automatic control for the opening and closing of the discharge doors of the hopper similar to the control arrangement associated with the material supply bin.

Figure 9 is a schematic view of the control mechanisms for the modified form of the batch weighing machine illustrated in Figure 8.

As shown on the drawings:

The improved automatic batch weighing machine of this invention comprises a framework 1 of any suitable construction wherein the two front uprights are connected by means of a transverse front plate 2. Rigidly supported in the upper portion of the frame 1, by any suitable means, is a material supply or storage bin 3 of a downwardly tapered form terminating in an outlet neck 4. The material which is to be weighed out in predetermined quantities or in batches is deposited in the storage bin 3 and is prevented from dropping out of the discharge mouth or neck 4 by means of a pair of curved or arcuate doors 5. Each of the doors 5 is provided with end arms 6 which are pivotally supported on pins or subshafts 7. Each of the door arms 6, beyond the pivot point thereof, is provided with an integral gear segment 8. As clearly illustrated in Figure 1, the gear segments 8 on each side of the discharge neck 4 of the storage bin intermesh with each other so that when one of the doors 5 is opened, the other door will be simultaneously operated.

As illustrated in Figure 2, one of the bin doors 5 is formed with an arm 9 to which the lower end of a piston rod or stem 10 is pivotally connected. The piston rod 10 forms part of an air control mechanism comprising an air cylinder 11 which is secured on the exterior of the storage bin 3 by suitable supporting brackets. Engaged on the inner end of the piston rod 10 and slidably disposed within the air cylinder 11 is a piston head which is adapted to be slidably moved within the air cylinder 11 by means of air pressure adapted to be admitted into the air cylinder alternately below the piston head and above said piston head by the respective air tubes 12 and 13.

The air tubes 12 and 13 are connected with a solenoid operated air valve unit 14 which is mounted on the front of the crossboard or panel 2 as clearly illustrated in Figure 1. The solenoid operated air valve unit is provided with a manually operable operating handle 15. Connected to the solenoid operated air valve unit 14 is an air supply tube or pipe 16 which is connected with a suitable source of compressed air.

The solenoid operated air valve unit 14 is connected by means of wires 17 and 18 to a standard lever type of limit switch 19 which is mounted on the back of the upper portion of the cross panel 2. The limit switch 19 is provided with a pivoted arm 20 carrying a roller 21 (Figure 6). Connected in series in the wire or line 17 is a battery 22 or any other suitable source of electrical energy.

Mounted on the front of the cross panel 2 is a graduated dial 23 provided with graduation markings which are numbered to indicate the weights of the batches which are to be weighed by the machine. Mounted on the back of the panel 2 is a casing or housing 24 which encloses a bracket plate 25 secured to the inner face of the panel 2 as clearly illustrated in Figure 6. Integrally formed on the mounting plate 25 is a collar 26 in which a sleeve 27 is supported. The sleeve 27 projects forwardly through an opening in the panel 2 and has supported on the outer projecting end thereof a movable indicator 28. The indicator 28 is mounted intermediate its end.

One end of the indicator is formed to provide a pointer or indicating tip 29, while the opposite end is formed with a head 30 for coaction with the roller 21 of the limit switch 19. Journalled in the bearing 27 is an indicator shaft 31, the front projecting end of which is threaded and supports a hand wheel 32, which when the indicator 28 is set in a selected position on the dial, is adapted to be rotated to engage the set indicator to hold the same in its position of adjustment. Keyed or otherwise secured on the inner end of the indicator shaft 31 is a small gear or pinion 33. When the hand wheel 32 is rotated into its innermost position, the set indicator 28 is locked with the sleeve 27 to the indicator shaft 31 to be rotated with the pinion 33.

Meshing with the pinion 33 is a gear quadrant 34 which, together with the pinion 33, is enclosed by the housing 24. The gear quadrant 34 is keyed to a quadrant shaft 35 which is journalled in a bearing collar formed on the bracket plate 25 within the housing 24. The quadrant shaft 35 projects rearwardly through an opening in the wall of the housing 24 and has keyed on the outer end thereof an actuating link arm 36. The end of the link arm 36 is pivotally connected to a link 37, the opposite end of which is engaged on a pivot pin 38 which is mounted on the front side of a material receiving or measuring hopper 39.

The measuring hopper 39 is vertically movable and is positioned beneath the discharge end of the supply or storage bin 3, as clearly illustrated in Figures 1 and 2. The measuring hopper 39 is of a tapered shape having the lower end thereof terminating in a discharge mouth or neck 40. The open end of the neck 40 is closed by means of a pair of doors 41 which are of curved or arcuate shape having supporting arms 42 integrally formed on the ends thereof for pivotal support on supporting pins 43 mounted on the front and back walls of the neck 40 of the measuring hopper. Each of the door supporting arms 42 has integrally formed thereon a gear segment 44.

The gear segments 44 of the arms 42 mesh with one another, as clearly illustrated in Figure 1, so that when one of the doors is actuated, the opposite door will also be operated. Mounted on one of the arms 42 of one of the doors 41 is a manually operable lever 45 for opening and closing the door 41 when desired.

The hopper 39 is secured to hopper supports 46 which in turn have connected thereto the lower ends of four vertically disposed cylinder shafts or rods 47.

Each of the cylinder shafts 47 forms part of a spring cylinder supporting unit, four of which are provided for resiliently supporting the measuring hopper in position beneath the storage bin 3. As clearly illustrated in Figure 3, each of the spring cylinder units includes a cylinder 48 which encloses a heavy coiled spring 49 which surrounds the shaft 47 and has the upper end thereof positioned beneath a spring plate or plunger head 50 which is slidably mounted within the cylinder 48, so that the weight of the measuring hopper is supported on the four springs 49 of the spring cylinder units. The cylinders 48 are supported by means of lower brackets 51 fastened to the framework 1, while the upper ends of the cylinders are provided with hanging bolts 52, the upper ends of which are secured to angle supports 53 which are rigidly secured across the front and back of the lower portion of the storage bin 3.

Figures 1 to 7 inclusive disclose an automatic batch measuring machine in which the doors of the measuring hopper are adapted to be manually opened and closed by means of the lever 45.

Figures 8 and 9 illustrate a modified form of the machine wherein the doors of the measuring hopper are adapted to be automatically operated by remote control, by equipping the hopper doors with an air cylinder control mechanism similar to the arrangement used in connection with the bin doors 5. The air cylinder connected with the hopper doors 41 is designated by the reference numeral 11ᵃ, and the air pipes connected with said cylinder are designated by the numerals 12ᵃ and 13ᵃ respectively. The air tubes or lines 12ᵃ and 13ᵃ connect with a solenoid operated air valve unit 54 (Figure 9) to which wires 55 and 56 are connected. Connected in series with the wire 55 is a battery 57 or other suitable source of electrical energy. The wires 55 and 56 are connected with a remote control switch 58 provided with two control buttons, one of which governs the opening of the hopper doors 41, while the other controls the closing of said doors.

In the modified form of the machine illustrated in Figures 8 and 9, attention is also called to the fact that the operating handle 15 of the solenoid operated air valve 14 is omitted or not used, and the solenoid operated air valve is accordingly arranged to be operated from remote control by connecting circuit lines or wires 59 and 60 to the solenoid operated air valve 14, as illustrated schematically in Figure 9. Connected in series in the line or wire 60 is a battery 61 or other suitable source of electrical energy. The wires 59 and 60 are connected with a remote control switch 62 which may be operated at a remote control station for governing the starting and stopping of the batch weighing machine.

In the operation of the machine as illustrated in Figures 1 to 7 inclusive, a material such as sand which is to be weighed out in batches is deposited in the storage bin 3 with the doors 5 in closed position and with the control handle 15 in open position. The operator then determines the weight of the batch of the material desired and accordingly swings the indicator 28 so that the pointer 29 thereof registers with the number on the dial 23 designating the selected weight of material to be weighed out. When the machine is started, the control doors 41 of the measuring hopper are also closed.

With the indicator pointer 29 pointing to a number on the dial 23, say, for example, 200 which indicates the weight of the material to be measured out, the operating handle 15 is closed thereby causing the solenoid of the air valve unit 14 to be actuated to cause compressed air from the supply pipe 16 to pass through the pipe 12 into the lower portion of the air cylinder 11 to move the plunger head within said cylinder upwardly thereby actuating the plunger stem 10 to draw the same inwardly thereby causing the doors 5 of the storage bin 3 to open.

The material from the bin 3 is, therefore, permitted to drop from the bin into the measuring hopper 39 thereby weighting the hopper 39 and causing the same to move downwardly compressing the springs 49 within the cylinders 48. With the downward movement of the hopper 39, the links 37 and 36 are actuated thereby causing rotation of the gear quadrant 34 and rotation of the pinion 33 to partially rotate the indicator shaft 31 thereby causing the indicator 28 to swing the point 29 thereof away from the selected number or division on the dial 23 towards the full mark on the dial. Attention is called to the fact that when the dial point 29 is moved to register with one of the marks on the dial, the indicator is locked to the indicator shaft by turning the hand wheel 32 to a locking position.

When the indicator point 29 reaches the full mark on the dial, the indicator head 30 is brought into contact with the roller 21 of the limit switch 19 to cause automatic operation thereof and a reversal of the flow of air into the cylinder 11 so that the compressed air will enter the top of the cylinder through the tube 13 permitting the air already in the cylinder to be exhausted through the tube 12. This will cause a reversed operation of the air cylinder mechanism so that the bin doors 5 will be automatically closed as soon as the required amount of material from the bin 3 has been deposited in the measuring hopper 39.

After a predetermined quantity of the material or a selected batch has been deposited in the measuring hopper 39 as hereinbefore described, the mechanisms will remain at ease depending upon the manual operation of the lever 45 to open the hopper doors 41 to discharge the measured batch of material from the hopper.

After the emptying of the hopper 39 of the measured batch of the material, the hopper doors 41 are then manually closed by means of the lever 45, and the compressed springs 49 act automatically to raise the shafts 47 thereby returning the hopper upwardly towards its normal position causing the links 36 and 37 to actuate the gear quadrant 34 which in turn operates the pinion 33 to cause the indicator 28 to be swung from the position illustrated in Figure 1 back into the selected position with the pointer 29 again registering with the 200 mark on the dial 23. The cycle of operation will then be repeated, so that predetermined quantities or batches of the material carried in the storage bin 3 will automatically be measured out into the measuring hopper 39 from which the batches of the material are adapted to be discharged at the will of the operator who controls the opening and closing of the hopper doors 41 by means of the lever 45. After the required number of batches have been measured out, the machine may be stopped by moving the solenoid control handle 15 into open position.

To reset the indicator 28 for measuring different quantities or batches of the material, it is only necessary to release the hand wheel 32, and swing the dial into the desired position, after which the hand wheel is again tightened so that the machine is ready for automatically measuring out predetermined batches of the material.

When it is desired to control the operation of the machine from a remote control station, the arrangement illustrated and described in connection with Figures 8 and 9 of the drawings may be employed. In this case, the operation of the machine is similar to that already described, with the exception that the discharge doors 41 of the measuring hopper are adapted to be operated from remote control by means of the remote control switch 58, and the starting and stopping of the machine is adapted to be operated from remote control by actuation of the control switch 62 which governs the operation of the solenoid operated air valve unit 14. In this form of the machine after the indicator has been set in a selected position on the dial, the machine is started by pressing the button of the remote control starting switch 62 which causes the machine to function and deposit a predetermined amount of material in the weighing hopper 39. When the hopper is filled with the required batch of the material, the release button of the remote contol switch 58 is actuated to cause opening of the discharge doors 41. After the material has been discharged, the closing button of the remote control switch 58 is actuated to close the doors 41 permitting the cycle of operations to be repeated.

It will, of course, be understood that numerous details of construction may be varied through a wide range without departing from the principles of this invention, and it is, therefore, not the purpose to limit the patent granted hereon otherwise than necessitated by the scope of the appended claims.

I claim as my invention:

1. In an automatic batch weighing machine, a framework, a material storage bin rigidly supported thereon, a measuring hopper movably positioned beneath the storage bin, resilient supports for the measuring hopper, closure means for the storage bin, an air operated mechanism for actuating the bin closure means, an air valve unit for governing the operation of the air actuated mechanism, a graduated dial mounted on the framework, an indicator associated with said dial and arranged to be set in a predetermined position on said dial to indicate the weight of the batch of material to be automatically discharged from the storage bin into the measuring hopper to cause movement thereof and movement of the indicator over the dial, a limit switch device supported on the framework and connected with the air valve unit and positioned to be actuated by the indicator when the desired amount of material has been deposited into the measuring hopper to cause actuation of the air valve unit and reversal of the operation of the air actuated mechanism to cause automatic closing of the bin closure means, and closure means for the measuring hopper releasable to cause discharge of the measured batch of the material from the measuring hopper permitting the resilient supports to return the measuring hopper to normal position to automatically reset the indicator to cause operation of the air valve unit and a reverse operation of the air control mechanism to again open the bin closure means for the automatic measuring of another batch of the material.

2. In an automatic batch weighing machine, a material storage bin, a material measuring hopper positioned to receive material from the bin, spring supported plunger means permitting movement of the hopper with load variations, closure means for the bin, means connected with the closure means for automatically operating the same to govern the discharge of material from the bin, and a control member adapted to be set to determine the weight of the batch of the material to be discharged from the bin into the hopper and operable by the movement of the measuring hopper to time the operation of the control means governing the operation of the closure means for the storage bin.

3. An automatic batch weighing machine comprising a support, a material storage bin supported thereon, a movably supported material receiving hopper positioned to receive material discharged from the bin, spring supported plungers supporting the hopper, closure means for controlling the discharge of material from the bin into the hopper, an air mechanism connected with the closure means for operating the same, an air valve device connected with the air mechanism to govern the operation thereof, a limit switch connected with the air valve device, graduated means for determining the size of the batch of the material to be discharged from the bin into the hopper, an indicating means adapted to be set with respect to the graduated means to determine the size of the batch of material to be discharged from the bin, said indicating means operable by the movement of the hopper with load variations to actuate the limit switch at a predetermined time to cause reversal of the air valve device and operation of the air mechanism to close the bin closure means when a predetermined batch of the material is discharged from the bin into the hopper.

4. An automatic batch weighing machine comprising a material storage bin, a support therefor, a material receiving hopper positioned to receive material from the bin, spring supported plunger means for movably supporting the hopper in position, control mechanisms connected with the bin closure means for opening and closing the same at predetermined times, a graduated dial, an indicating mechanism adapted to be set with respect to the graduated dial to determine the size of the batch of material to be discharged from the bin into the hopper, gear means connecting the indicating mechanism with the movable hopper and operable with the depositing of material into the hopper until the required batch of material has been deposited causing the indicating mechanism to rotate to actuate the control mechanisms to close the bin closure means, closure means for the hopper to hold the material in the hopper until the required batch has been deposited, and means for actuating the hopper closure means to empty the hopper to permit the spring supported plunger means to return the hopper to normal position and reset the indicating mechanism to cause automatic closing of the bin closure means to repeat the cycle of operations.

5. An automatic batch weighing machine comprising a material storage bin, a support therefor, a measuring hopper positioned to receive material from the bin, spring supported plunger mechanisms for resiliently mounting the hopper in position to permit movement of the hopper with load variations, closure means for the bin for controlling the discharge of material therefrom into the hopper, means for operating the bin closure means, control mechanisms for governing the operation of said operating means, a selectively adjustable indicating mechanism operable by the movement of the hopper to cause operation of the control mechanisms at the beginning and at the end of a batch depositing operation, and means for controlling the discharge of a batch of the material from the hopper causing the spring supported plunger mechanisms to return the hopper to normal position and causing the indicating mechanism to move into a position to allow the control mechanisms to reverse the operation of the operating means to again open the bin closure means to restart the cycle of operation.

6. An automatic batch weighing machine comprising a material storage bin, a support therefor, a material measuring hopper positioned to receive material from the bin, spring supported plungers for holding the hopper suspended in position to permit movement thereof with load variations, closure means for the bin, a device connected with the closure means for opening and closing the same, a solenoid operated air valve mechanism connected to govern the operation of said operating device, a limit switch connected with the solenoid operated air valve mechanism, indicating means connected for operation by the movement of the measuring hopper to be moved into and out of engagement with the limit switch, a graduated dial mechanism with respect to which the indicating mechanism is adapted to be set to determine the size of the batch of material to be discharged from the bin into the hopper, means for holding the indicating mechanism in a set position of adjustment with respect to the graduated dial mechanism, and means permitting unloading of the hopper to permit the spring controlled supports to return the hopper to normal position to repeat the automatic batch weighing operation.

7. An automatic batch weighing machine comprising a stationary material container, a support therefor, a material receiver, spring supported plungers connected to the material receiver to permit movement thereof with load variations, control means for governing the discharge of material from the container into the receiver, control means for the receiver for governing the discharge of a predetermined batch of material from the receiver, an actuating means connected with the container control means, a second actuating means connected with the receiver control means, an air valve mechanism connected with the container control means, a limit switch connected with the air valve mechanism, an indicator mechanism movable into contact with the limit switch to determine the opening and closing of the container control means to determine the quantity of the material discharged from the container into the receiver, and remote controls for governing the operation of the air valve mechanism, the actuating means connected with the receiver control means to open the same for a discharge of a batch of material from the receiver and to close the receiver control means when the receiver is emptied to allow the receiver to return to normal position to restart the cycle of operation.

ALFRED C. CHRISTENSEN.